(12) United States Patent
Ishioka (10) Patent No.: US 6,978,873 B2
(45) Date of Patent: Dec. 27, 2005

(54) CONNECTION STRUCTURE OF INDUCTION LINE COVER

(75) Inventor: Yasushi Ishioka, Shiga (JP)

(73) Assignee: Daifuku Co., Ltd., (JP)

( * ) Notice: Subject to any disclaimer, the term of this patent is extended or adjusted under 35 U.S.C. 154(b) by 0 days.

(21) Appl. No.: 10/829,537

(22) Filed: Apr. 22, 2004

(65) Prior Publication Data

US 2004/0211636 A1 Oct. 28, 2004

(30) Foreign Application Priority Data

Apr. 28, 2003 (JP) .............................. 2003-123026

(51) Int. Cl.[7] .............................................. B61L 5/00
(52) U.S. Cl. .............................. 191/10; 191/30; 191/3
(58) Field of Search .............................. 191/30, 32, 24, 191/22 R, 10, 3, 23 A; 104/111; 174/84 R, 174/85, 91, 84 S (56) References Cited

U.S. PATENT DOCUMENTS

| | | | | |
|---|---|---|---|---|
| 2,156,827 A | * | 5/1939 | Wehr | 104/111 |
| 2,254,147 A | * | 8/1941 | Horn | 191/23 A |
| 2,933,567 A | * | 4/1960 | Mageoch | 191/40 |
| 2,990,458 A | * | 6/1961 | Mageoch | 191/40 |
| 3,813,480 A | * | 5/1974 | Sprague | 174/92 |

FOREIGN PATENT DOCUMENTS

JP 06153305 5/1994 ............. B60L 5/00

* cited by examiner

Primary Examiner—Mark T. Le
(74) Attorney, Agent, or Firm—Kusner & Jaffe (57) ABSTRACT

An induction line cover includes a cylinder-shaped section into which an induction line can be fitted, plate-shaped sections continuously connected outwardly from a pair of ends created by cutting a slit longitudinally in the cylinder-shaped section at a circumferential position of the cylinder-shaped section, and engaging sections formed adjacent outer faces of the plate-shaped sections and being engageable toward the movement track. A cover joining member for connecting the induction line cover has a receiving section which can receive the engaging sections, and is configured to be accommodated within the extent of the outer diameter of the cylinder-shaped section when the engaging sections are engaged toward the movement track. By this, connection between induction line covers can be performed firmly with stability using the cover joining member, and sufficient clearance can be secured between the cover joining member and a pickup coil.

3 Claims, 12 Drawing Sheets

CONNECTION STRUCTURE OF INDUCTION LINE COVER

FIELD OF THE INVENTION

The present invention relates to a connection structure of an induction line cover used, for example, in a non-contact power supply system of a moving body.

BACKGROUND OF THE INVENTION

Conventionally, when an induction line which passes a high-frequency sine-wave current is installed along a movement track of a moving body, and non-contact power supply system of a moving body in which a pickup coil for extracting power in a non-contact manner from the induction line is provided in the moving body, a feeder line holding device is used to hold the induction line.

As a conventional feeder line holding device of this type, for example, a configuration such as seen in Japanese Patent Laid-open No. 6-153305 has been proposed. That is, brackets are installed at prescribed intervals along the track on the guiding rail side of the moving body, and hangers are suspended from these brackets. A cover is provided for the induction line. This cover has a slit formed by longitudinally cutting a cylinder such that the induction line is fitted into the slit in its longitudinal direction. And claws are provided at the ends created by thus cutting the slit in the cylindrical body. Recesses are formed at the end portions of the hangers to receive the claws (or engaging sections).

Covers are joined by using joining members. A joining member is formed by cutting a slit along one longitudinal end of a cylinder having an inner diameter matched to the outer diameter of the cover, and claws are formed to extend obliquely upward and downward from the ends created by cutting the slit. A round hole is formed at one end of each claw, and a long slide hole extending in the longitudinal direction is formed at the other end. A round hole in the end of one cover and this round hole of the joining member are fixed by a pin, and a round hole in the end of the other cover and the slide hole are engaged to each other by penetrating a pin through both of the holes so as to prevent opening of the joining member and to make this the other cover and the cover joining member freely slidable each other.

By inserting the claws of the cover, in which the induction line is fitted in the longitudinal direction, into the recesses at the front ends of the hangers suspended at prescribed intervals along the movement track, the induction line is laid along the movement track by being supported by covers and hangers without sagging. And, the covers are joined by joining members.

However, in the above conventional configuration, since the cover joining members protrude out of the outer diameter range of the cover, the cover joining member becomes thick (large in diameter) and a clearance (gap) is reduced between the cover joining member and the pickup coils. As a result, there are such possibilities that interference (physical contact) is caused to occur between the cover joining members and the pickup coils due to deformation arising from the problems of assembly precision, manufacturing precision and/or thermal expansion. In some cases, the cover joining members are threatened to break.

SUMMARY OF THE INVENTION

The present invention provides a connection structure of an induction line cover which enables strong and stable connection of induction line covers by using cover joining members, while securing an adequate clearance between the cover joining members and pickup coils.

The connection structure of an induction line cover of this invention is a connection structure of an induction line cover for use in a non-contact power supply system for a moving body, wherein the system comprises an induction line arranged to extend along a movement track of the moving body to pass high-frequency sine-wave current therethrough, and the moving body comprises a pickup coil for picking up power from the induction line in a non-contact manner. The induction line cover comprises a cylinder-shaped section into which the induction line can be fitted in the longitudinal direction, plate-shaped sections continuously connected outward from a pair of ends created by cutting out from the cylinder-shaped section a portion in the longitudinal direction at a circumferential position of the cylinder-shaped section, and engaging sections formed adjacent outer faces of the plate-shaped sections and being engageable toward the movement track. A cover joining member, which is provided to connect the induction line cover, has a receiving section for receiving therein the engaging sections, and is formed so as to be accommodated within the extent of the outer diameter of the cylinder-shaped section when the engaging sections are engaged toward the movement track.

According to the above configuration of the invention, in order to install the induction line along the movement track, the induction line is covered by an induction line cover. With the induction line being fitted into the cylinder-shaped section of the induction line cover, the induction line can be laid along the movement track by engaging a pair of engaging sections of the induction line cover toward the movement track. In this way, before or after laying the induction line along the movement track, the adjoining free ends of the induction line cover can be connected by a cover joining member. That is, the receiving section of the cover joining member is placed to oppose both engaging sections, the cover joining member is moved into proximity with the induction line cover, and by means of a fitting action (insertion action), the engaging sections are inserted into the receiving section, so that the engaging sections can be engaged in the receiving section, and thus the adjoining free ends of the induction line cover can be connected by means of the cover joining member.

At this time, by accommodating the cover joining member within the extent of the outer diameter of the cylinder-shaped section, induction line covers can be connected strongly and with stability by the cover joining member, while securing an adequate clearance between the cover joining members and the pickup coils. Further, it is possible to avoid affecting in any way the clearance between induction line cover and pickup coil. As a result, no interference (physical contact) occurs between the cover joining members and the pickup coils due to deformation arising from assembly precision, manufacturing precision, or thermal expansion, and breakage of cover joining members can be prevented.

In a preferred first aspect of a connection structure of an induction line cover of this invention, an engaging/disengaging lock comprises a protrusion and a recess formed on the opposing inner faces of the plate-shaped sections.

According to this first aspect, after fitting the induction line into the cylinder-shaped section of the induction line cover, by an engaging action of the protrusion and recess, the engaging/disengaging lock of the induction line cover can be engaged. This engaging action of the engaging/disengaging lock can be performed easily and quickly with leeway in flexibility, dimensions and the like, by bringing the flexible plate-shaped sections into mutual proximity with respect to the cylinder-shaped section, and the engaged attitude (locked state) can be maintained satisfactorily. With the engaging/disengaging lock in such a locked state, the receiving section of the cover joining member is brought to oppose both engaging sections, and by moving the cover joining member into proximity with the induction line cover, the engaging sections are inserted into the receiving section by means of a fitting action (insertion action), so that the induction line can be laid along the movement track.

In a second preferred aspect of a connection structure of an induction line cover of this invention, with the engaging/disengaging lock in the locked state, a concave groove is formed between both the plate-shaped sections on the outside of the engaging/disengaging lock.

According to this second aspect, by using this concave groove to separate the two plate-shaped sections by means of a tool or the like, the protrusion and the recess can be separated, and so the engaging of the engaging/disengaging lock can easily and reliably be released.

DETAILED DESCRIPTION OF PREFERRED EMBODIMENT

Below, a first embodiment of this invention, in which an induction line cover is adopted in a single-line induction line, is explained based on FIG. 1 through FIG. 10.

In FIG. 1 through FIG. 5, a transportation vehicle (one example of a moving body) 1 comprises a driving trolley 2, a driven trolley 3, and a freight transport carrier 4 supported by these trolleys 2 and 3; a guide rail (one example of a movement track) 5, which moveably guides the transportation vehicle 1, is provided.

Figure 1:
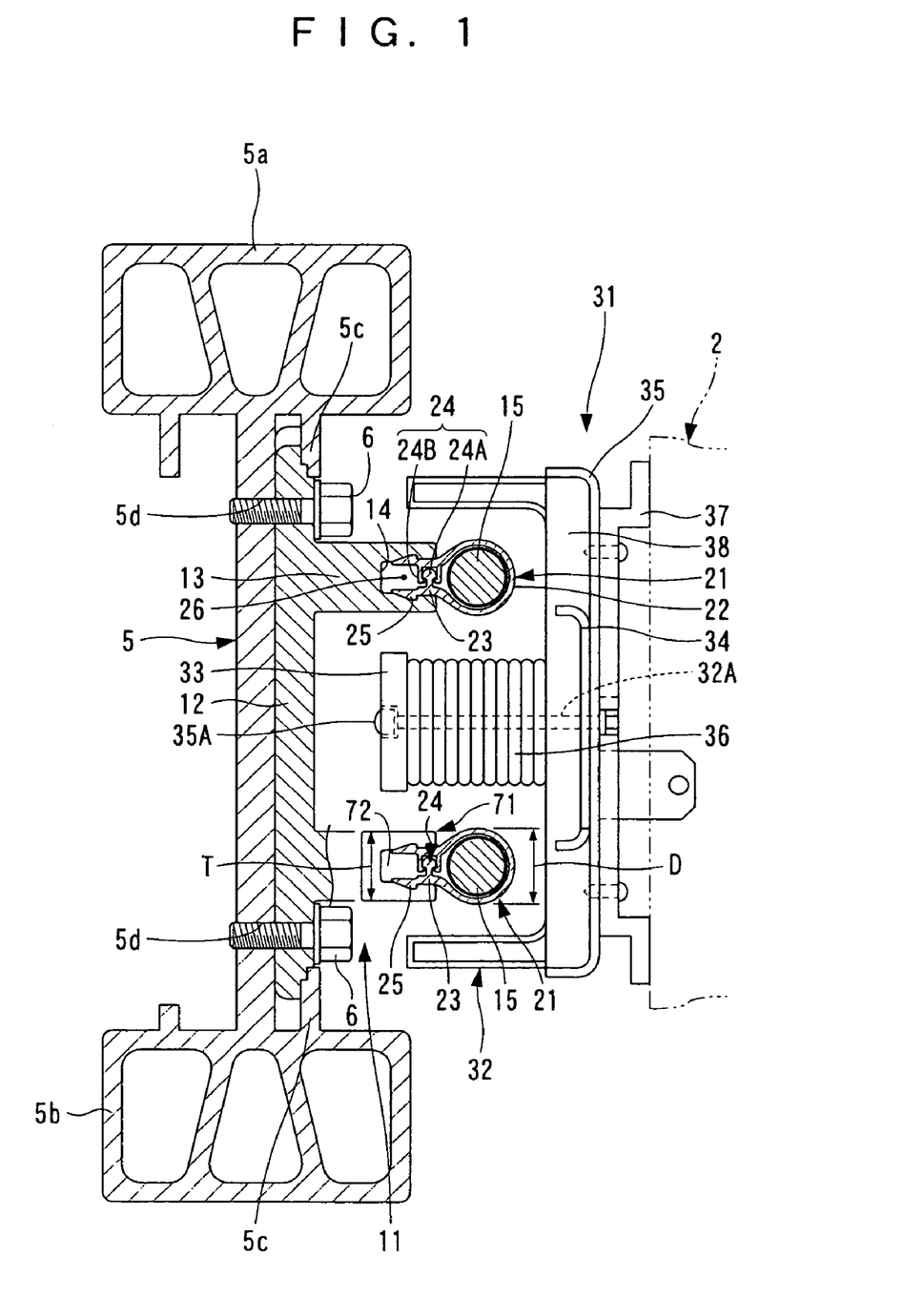
FIG. 1 is a longitudinal cross-sectional front view of principal components of a non-contact power supply system of a moving body using an induction line cover, according to a first embodiment of the invention.
Figure 2:
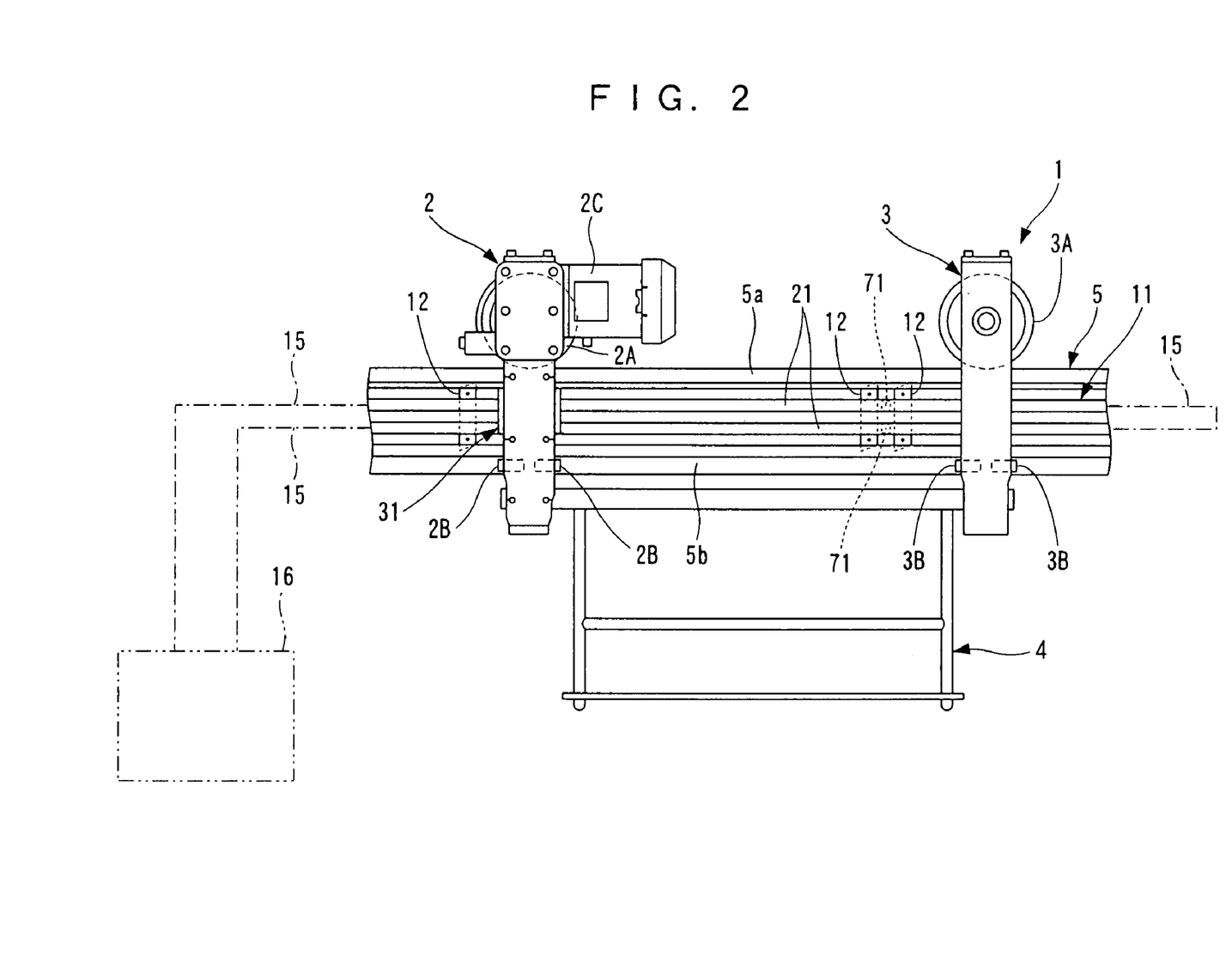
FIG. 2 is a side view of the non-contact power supply system of the moving body using the induction line cover.
Figure 3:
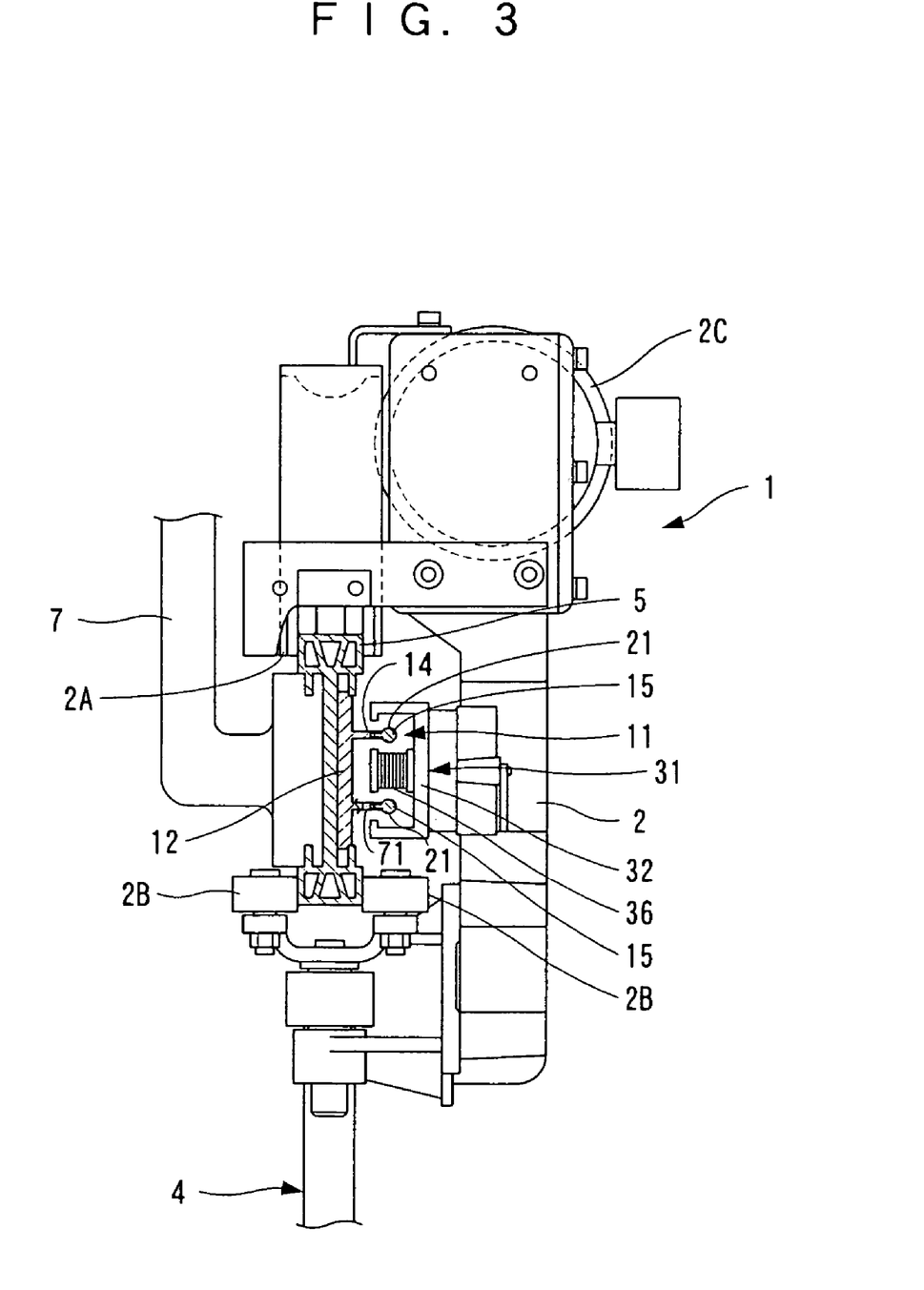
FIG. 3 is a front view of the non-contact power supply system of the moving body using the induction line cover.

The above driving trolley 2 comprises a traveling wheel 2A which meshes with the upper part of the guide rail 5, a steady roller 2B which makes contact from both lateral sides with the lower part of the guide rail 5, and a pickup unit 31; the traveling wheel 2A is driven by the electric motor with reduction gear 2C. The driven trolley 3 comprises a traveling wheel 3A which meshes with the upper part of the guide rail 5, and a steady roller 3B which makes contact from both lateral sides with the lower part of the guide rail 5. The above guide rail 5 comprises a wheel guide 5a on the upper part and a roller guide 5b on the lower part, and is supported, suspended from the ceiling or similar, by a support frame 7 connected to one lateral side.

On the side of the above guide rail 5 other than the side on which is installed the support frame 7, the induction line unit 11 is provided. This induction line unit 11 has brackets 12 installed on one lateral side of the guide rail 5 at prescribed intervals along the guide rail 5; on [each of] these brackets 12 is provided, above and below, a pair of hangers 13 protruding laterally outwards.

The above brackets 12 are fixed in place on a side of the guide rail 5 by mating the upper and lower end portions with claws 5c protruding inward from the wheel guide 5a and roller guide 5b of the guide rail 5, screwing together set-screws 6 passing through the upper and lower end portions and screw holes 5d provided in the guide rail 5, and causing the ends to bite into the guide rail 5. Recess-shaped receiving sections 14 are formed at the tips of the above hangers 13, configured to enable engaging of the engaging sections 25 of the induction line cover 21 with the receiving sections 14.

The above induction line cover 21 covers the induction line 15 installed along the above guide rail 5. The induction line 15 passes a high-frequency sine-wave current, and comprises twisted wire (hereafter called Litz wire) formed from a collection of insulated fine wires or from multi-core cable, covered with an insulating material such as a resin. The starting end of the induction line 15 is connected to the power supply system 16, to which the other end is also connected, forming a loop shape with different conduction directions.

The above induction line cover 21 comprises a cylinder-shaped section 22 into which the induction line 15 can be fitted in the longitudinal direction, the above induction line 15, plate-shaped sections 23, arising by cutting away in the longitudinal direction the cylinder-shaped section 22 at one place in the circumferential direction and provided continuously in the outward direction from the pair of end portions; an engaging/disengaging lock 24, formed on the opposing inner faces of the plate-shaped sections 23; and engaging sections 25, formed on the outer-face side of the plate-shaped sections 23. [The induction line cover 21] is formed integrally from, for example, a resin.

The above cylinder-shaped section 22 has an inner diameter determined in accordance with the outer diameter of the induction line 15 to be fitted thereinto as a single line. The above engaging/disengaging lock 24 comprises a protrusion 24A formed on the inner face of one of the plate-shaped sections 23, and a recess 24B formed on the inner face of the other plate-shaped section 23; the protrusion 24A and recess 24B are formed along the entire length in the longitudinal direction. Here, when the engaging/disengaging lock 24 is in the locked state, a concave groove 26 is formed on the outside of the engaging/disengaging lock 24 between the two plate-shaped sections 23.

The above engaging sections 25 are spear-shape, and are formed on the outer-face side of both plate-shaped sections 23 along the entire length in the longitudinal direction. Here, when the engaging/disengaging lock 24 is in the locked state, the engaging sections 25 are configured to enable engaging with (insertion into) the receiving section 14 on the side of the above bracket 12 (the movement track side), and is configured so as not to fall out due to the engaging. The above components 12 through 26 form one example of an induction line unit 11.

In the above pickup unit 31, five (a plurality of) ferrite cores 32 with an E-shaped cross section are aligned in the horizontal direction (in the direction along the guide rail 5 in FIG. 2) with the protrusion 32A at the centers thereof directed horizontally, and with a ferrite sheet 33 placed on the central protrusion 32A of each ferrite [core] 32; each ferrite sheet 33 is fixed in place, through a nonmagnetic plate 34, to the base 35 by a screw 35A. A pickup coil 36 is formed by winding the above Litz wire in, for example, 10 to 20 turns, from the top to the bottom face of the protrusion 32A at the center of each ferrite core 32 aligned in the horizontal direction, and a mounting member 37 is mounted on the side of the base 35. Urethane rubber 38 is inserted between the fold-back section of the ferrite 32 and plate 34 at both ends. One example of a pickup unit 31 is formed by the above components 32 to 38 and the like.

As shown in FIG. 1, the pickup unit 31 is such that the center of the central protrusion 32A in the ferrite core 32, that is the pickup coil 36, is adjusted to position perpendicular to the guide rail 5 at the substantial center between the pair of induction lines 15 installed in parallel in the induction line unit 11, and fixed in place via the mounting member 37 on the side of the driving trolley 2. By this, when a current (an alternating current) is passed through the induction lines 15, power is generated in a non-contact manner in the pickup coil 36.

Figure 10:
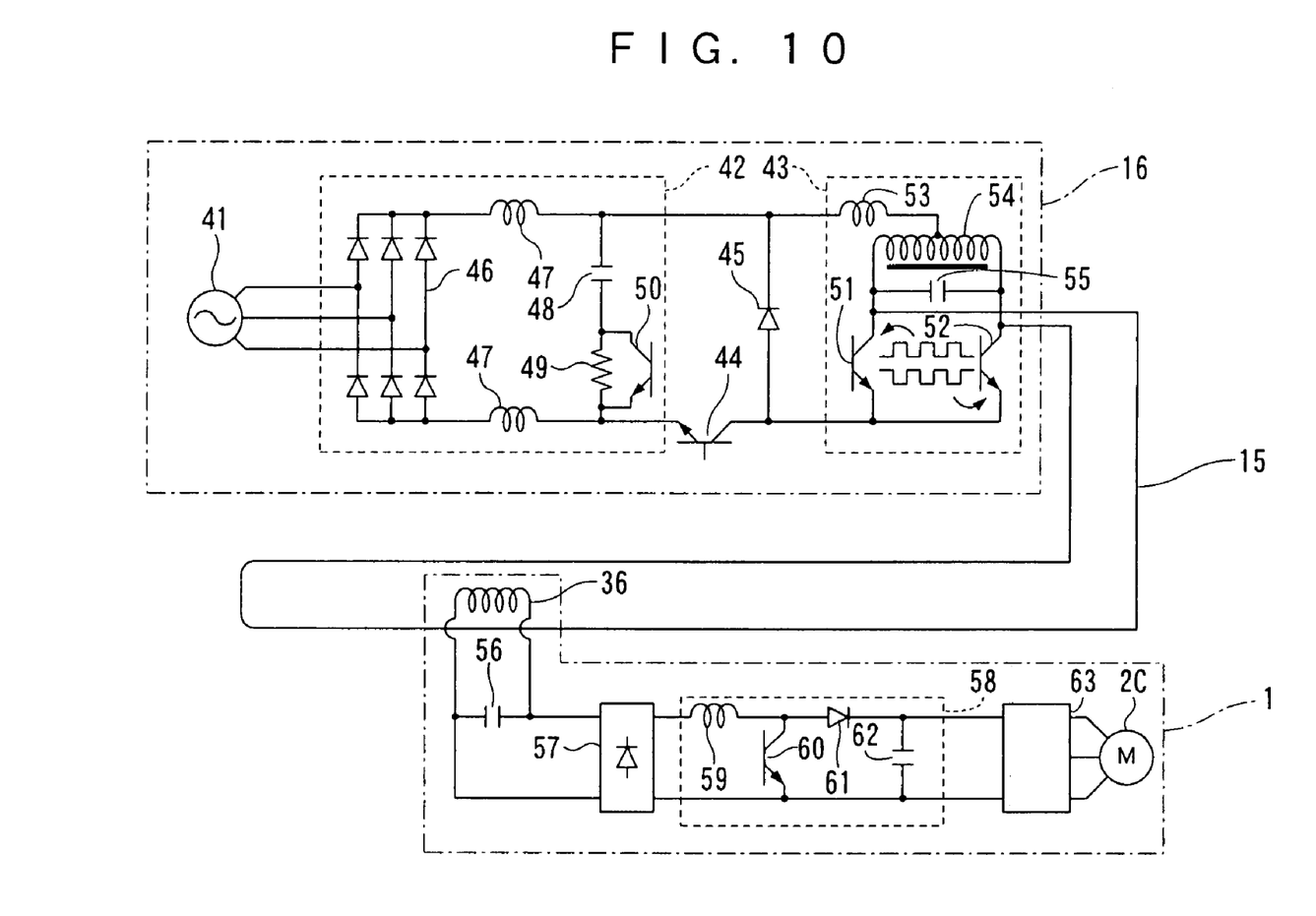
FIG. 10 shows a circuit configuration of the non-contact power supply system of the moving body using the induction line cover.

As shown in FIG. 10, the above power supply system 16 comprises an AC 200 V three-phase alternating-current power supply 41, a converter 42, a sine-wave resonant inverter 43, overcurrent protection transistor 44, and diode 45. The converter 42 comprises a full-wave rectifying diode 46, a coil 47 forming a filter, a capacitor 48, a resistor 49, and a transistor 50 which short-circuits the resistor 49.

As indicated in the figure, the sine-wave resonant inverter 43 comprises transistors 51, 52 driven by mutually excited square-wave signals, a current-limiting coil 53, a coil 54 for current supply connected to the transistors 51, 52, and a capacitor 55 which forms a parallel resonant circuit with the induction line 15. The transistor control device is omitted.

In the transportation vehicle 1, a capacitor 56 is provided in parallel with the pickup coils 36 to form a resonance circuit, resonating at a frequency of the pickup coils 36 and induction line 15. A rectifying circuit 57 is connected in parallel with this resonance circuit capacitor 56, and a stabilizing power supply circuit 58 is connected to control the output of the rectifying circuit 57 at a prescribed voltage. And a load such as an electric motor 2C is connected via an inverter 63 to this stabilizing power supply circuit 58. The above stabilizing power supply circuit 58 comprises a current-limiting coil 59, output rectification transistor 60, diode 61 serving as a filter, and capacitor 62. The transistor control device is omitted.

With the above configuration, induction lines 15 which pass high-frequency sine-wave current are installed along the guide rail 5 of the transportation vehicle 1, and the above transportation vehicle 1 comprises a non-contact power supply system for the moving body, provided with pickup coils 36 for picking up power from the above induction lines 15 in a non-contact manner. As a result the transportation vehicle 1 receives power in a non-contact manner from the induction lines 15 of the guide rail 5 via the pickup coils 36, and drives the traveling wheel 2A using an electric motor with a reduction gear 2C, to which power is supplied, so that the transportation vehicle moves by being guided by the guide rail 5.

A cover joining member 71 is provided to connect the induction line cover 21. The cover joining member 71 is of a quadrangle block shape, in which a receiving section 72 is formed to be engaged with the engaging sections 25 of the above induction line cover 21. This receiving section 72 is formed in a concave groove shape, being open at one of the four side faces and both ends in the longitudinal direction, in which concave step-shaped sections 72a are formed at the mutually opposing inner faces. The spear-shaped sections of the above receiving section 72 can engage these concave step-shaped sections.

The cover joining member 71 is formed integrally from resin, and is formed such that the thickness T of the cover joining member 71 can be accommodated within the range of the outer diameter D of the cylinder-shaped section 22 when the engaging sections 25 of the above induction line cover 21 are engaged in the receiving section 14 (on the movement track side), that is, T<D establishes.

Below, the action of the above-described first embodiment is explained.

Figure 4:
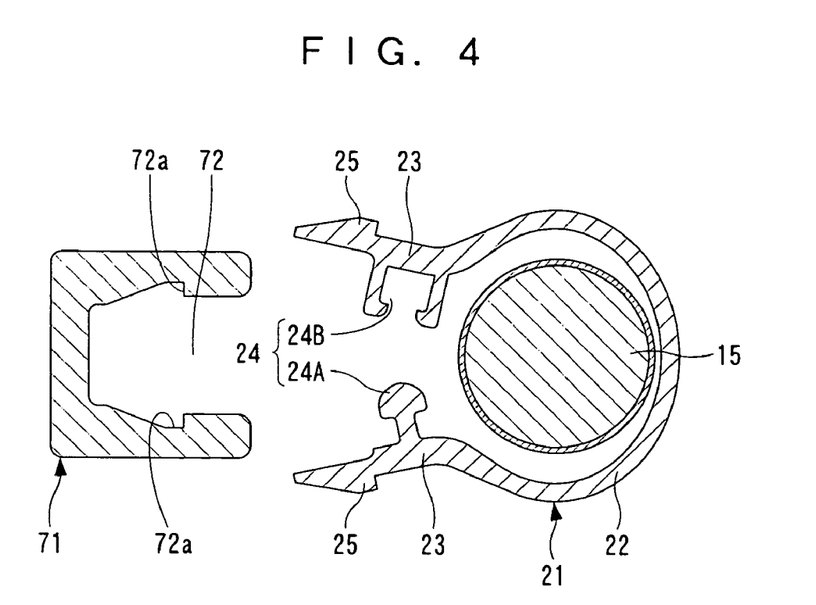
FIG. 4 is a longitudinal cross-sectional front view of the connection structure of the induction line cover before being connected.

The loop-shape induction line 15 is laid along the guide concave groove 5, with the starting end connected to the power supply system 16 and the other end connected with different conduction directions. This induction line 15 is covered by the induction line cover 21. As shown in FIG. 4, in the state where the induction line 15 is fitted in the cylinder-shaped section 22 of the induction line cover 21, a tool (not shown) or the like is manually used to engage the engaging/disengaging lock 24.

Figure 5:
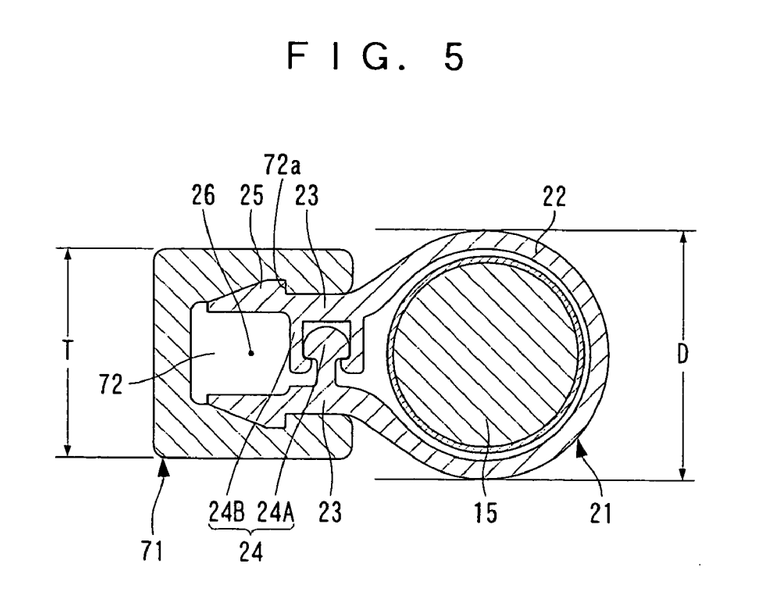
FIG. 5 is a longitudinal cross-sectional front view of the connection structure of the induction line cover when being connected.
Figure 6:
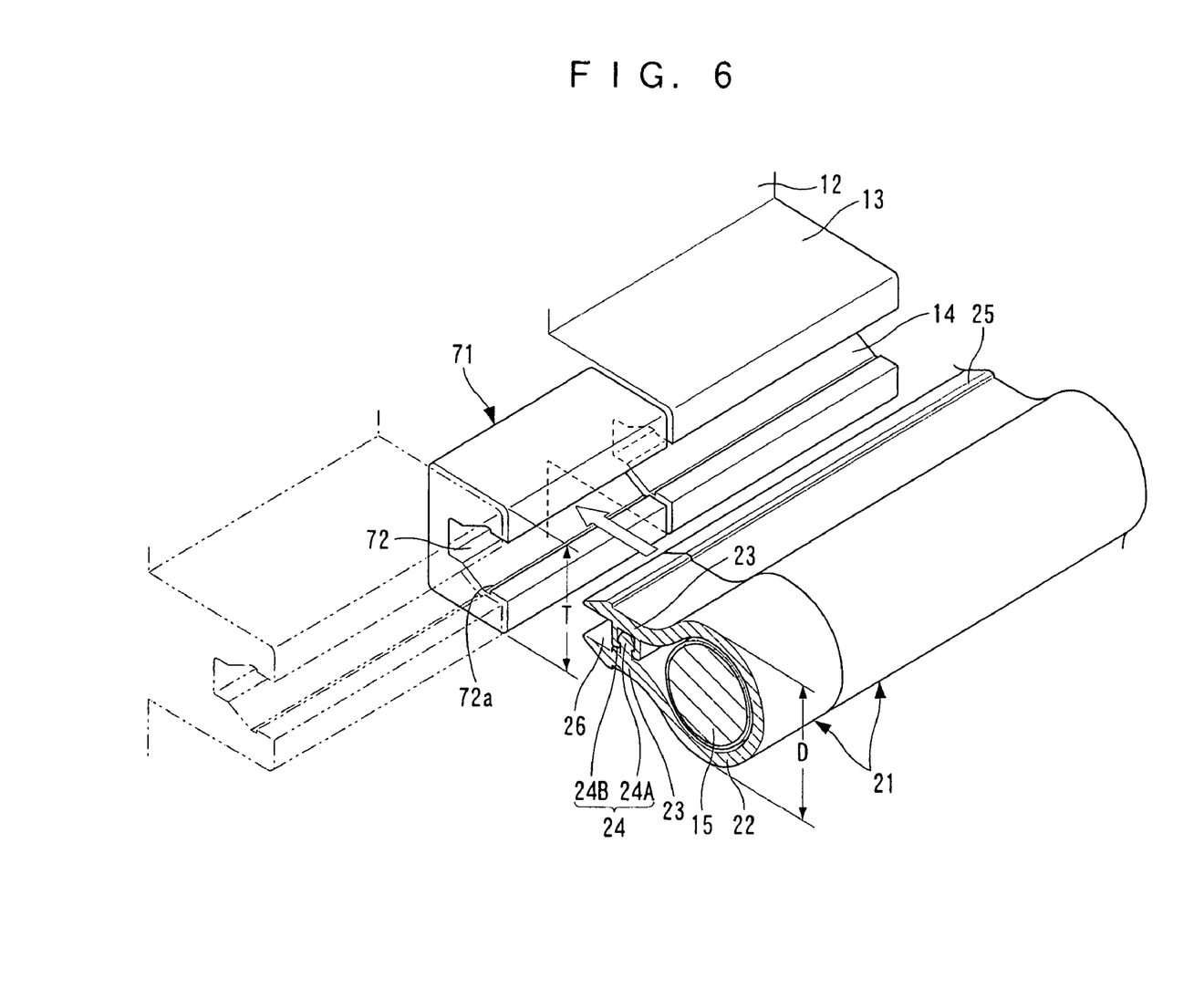
FIG. 6 is a partially cutaway view in perspective of the connection structure of the induction line cover before being connected.
Figure 7:
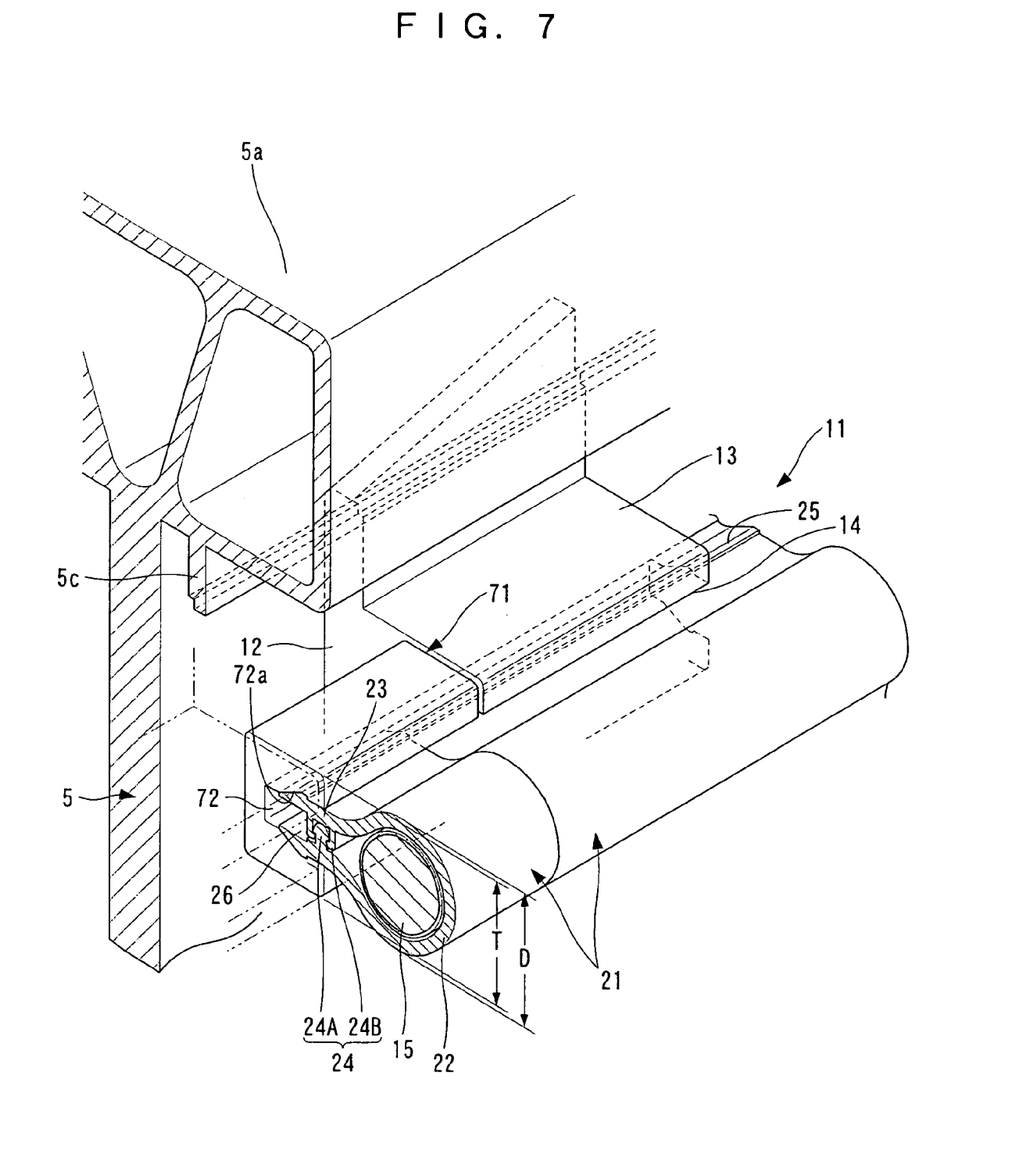
FIG. 7 is a partially cutaway view in perspective of the connection structure of the induction line cover when being connected.
Figure 8A:
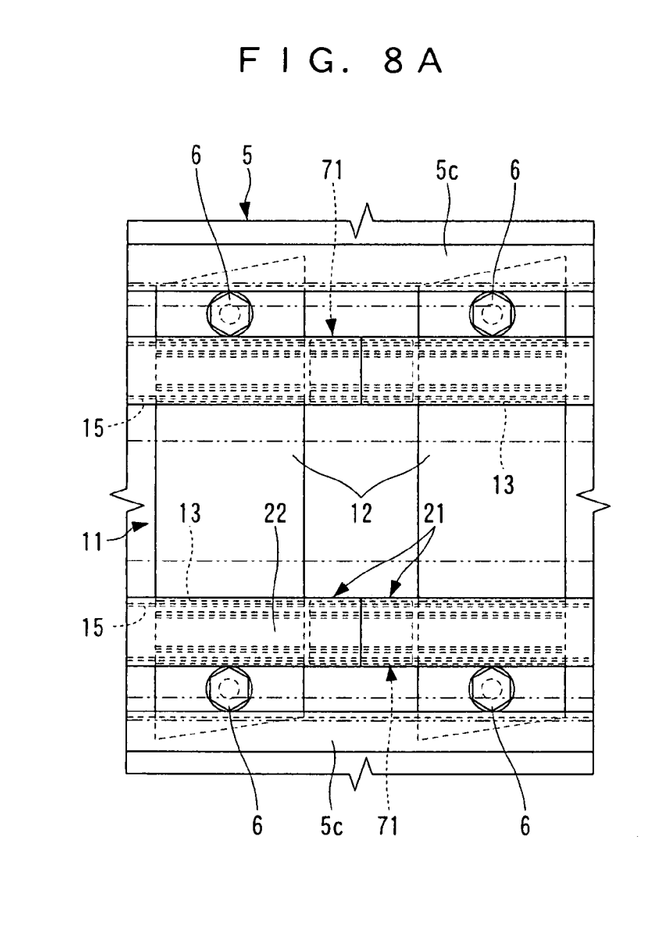
FIG. 8A is a side view and FIG. 8B is a partially cutaway side view, respectively of the connection structure of the induction line cover when being connected.
Figure 8B:
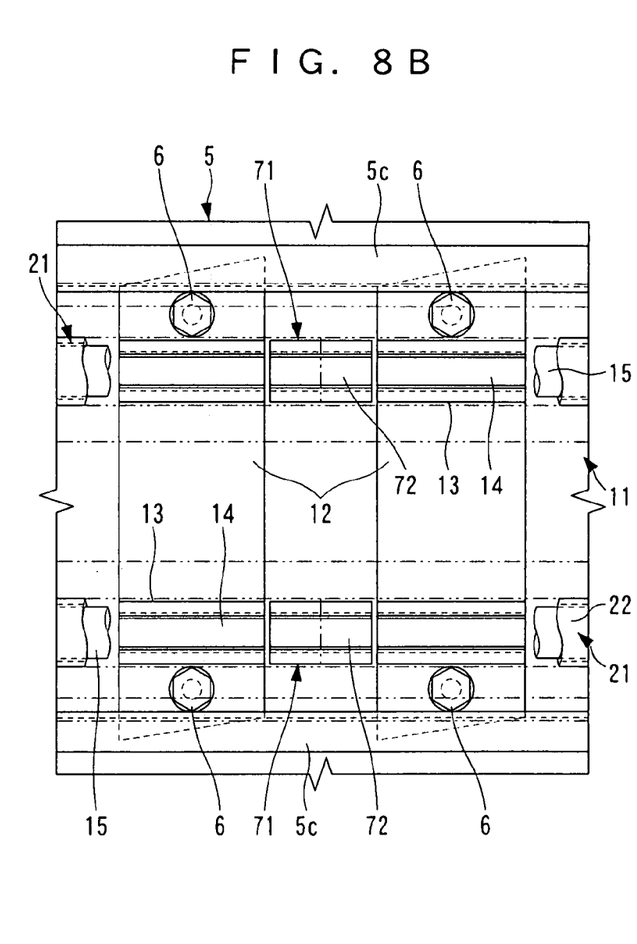
Figure 9A:
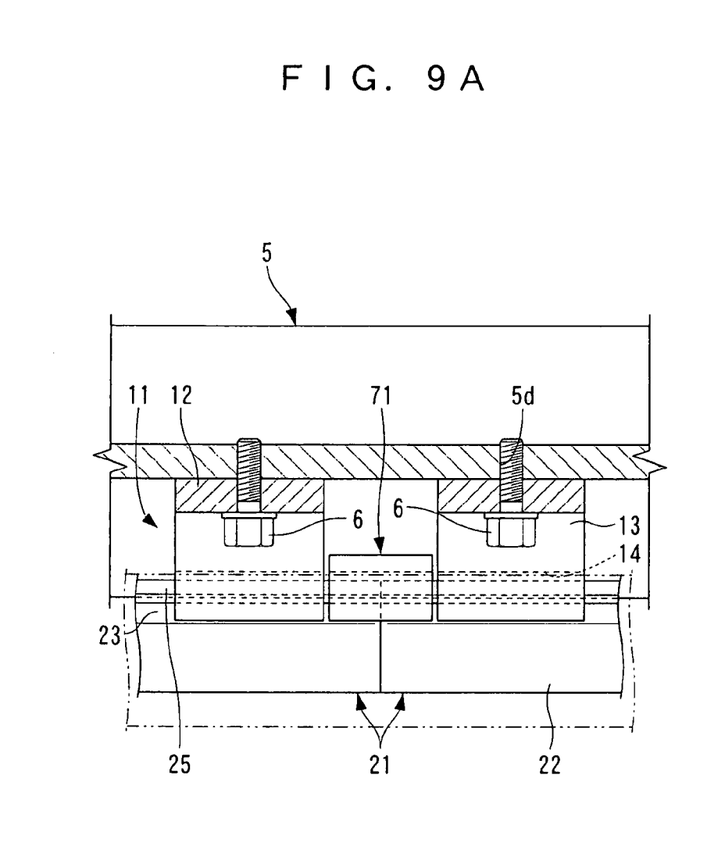
FIG. 9A is a partially cutaway plan view and FIG. 9B is a cross sectional plan view, respectively of the connection structure of the induction line cover when being connected.
Figure 9B:
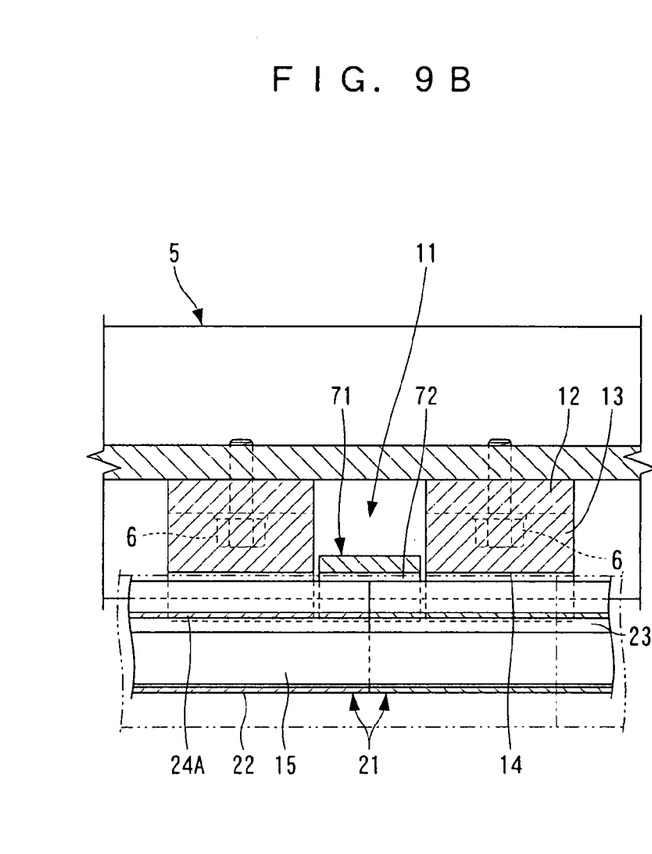

In other words, the two plate-shaped sections 23 are moved into mutual proximity, and as shown in FIG. 5 and FIG. 6, the protrusion 24A and recess 24B are engaged, so that the engaging/disengaging lock 24 can be engaged along the entire length of the induction line cover 21. With the engaging/disengaging lock 24 in the locked state in this way, the area between the two plate-shaped sections 23 on the outer side of this engaging/disengaging lock 24 forms a concave groove 26 along the entire length.

The above-described engaging action of the engaging/disengaging lock 24 is performed by bringing the flexible plate-shaped sections 23 into mutual proximity with respect to the cylinder-shaped section 22, and can be performed easily and quickly with leeway in flexibility, dimensions and the like. Further, by forming the engaging/disengaging lock 24 over the entire length, the engaged attitude (locked state) can be maintained satisfactorily over the entire length.

As described above, the engaging/disengaging lock 24 is put into the locked state, the pair of engaging sections 25 of the induction line cover 21 are brought to oppose the receiving section 14 of the hanger 13 from outside, and the engaging sections 25 are inserted into the receiving section 14 by means of pushing. By this, the engaging sections 25 can be engaged in the receiving section 14 as shown in the upper part of FIG. 1, and so the induction line 15 can be laid along the guide rail 5.

In this way, the engaging sections 25 are engaged in the receiving section 14, and the induction line 15 is laid along the guide rail 5, before or after which the adjacent free ends of the induction line cover 21 are connected by the cover joining member 71. That is, when the engaging/disengaging lock 24 is in the locked state, the receiving section 72 of the cover joining member 71 is brought to oppose the two engaging sections 25. Then, the cover joining member 71 is brought into proximity with the induction line cover 21, and by means of a fitting action (insertion action), the engaging sections 25 are inserted into the receiving section 72.

By this, the engaging sections 25 can engage the step-shaped sections 72a of the receiving section 72, and as shown in the lower part of FIG. 1 and in FIG. 5 and FIGS. 7 through 9, the adjacent free ends of the induction line cover 21 can be connected by a cover joining member 71. At this time, the thickness T of the cover joining member 71 is accommodated within the range of the outer diameter D of the cylinder-shaped section 22.

The above-described connection operation (engaging action) of the cover joining member 71 can be performed easily and quickly with leeway in flexibility, dimensions and similar, by bringing the flexible plate-shaped sections 23 into mutual proximity with respect to the cylinder-shaped section 22. Further, the connected attitude (engaged attitude) can be maintained satisfactorily through the elastic reaction force of the plate-shaped sections 23. The elastic force of the cover joining member 71, formed from resin, can also be utilized in the connection operation and in maintaining the connected attitude.

The induction line 15 can be removed from the side of the guide rail 5 for maintenance and inspections or the like by an action opposite that described above. That is, first the pair of engaging sections 25 in the above induction line cover 21 are brought into mutual proximity, the engaging sections 25 are separated from the receiving section 72, and the cover joining member 71 is removed from the induction line cover 21. Then, the pair of engaging sections 25 in the induction line cover 21 are brought into mutual proximity to separate the engaging sections 25 from the patchable section 14, and as shown in FIG. 6, the induction line 15 is removed together with the induction line cover 21 from the side of the bracket 12.

Then, using a tool (not shown) or the like to cause separation of the two plate-shaped sections 23 by manual action, the protrusion 24A and recess 24B are separated as shown in FIG. 4, and the engaging of the engaging/disengaging lock 24 can be released. The separation action at this time can be performed easily and quickly by positioning a tool or a hand in the concave groove 26 formed along the entire length of the two plate-shaped sections 23.

Next, the action of the circuit configuration of the above power supply system 16, induction line 15, and transportation vehicle 1 is explained.

First, the AC 200 V three-phase alternating current output from the AC power supply 41 is converted into direct current by the converter 42, converted into a high-frequency sine wave at, for example, 10 kHz by the sine-wave resonant inverter 43, and supplied to the induction line 15. Due to the magnetic flux arising in the induction line 15, a large electromotive force is generated in the pickup coil 36 of the transportation vehicle 1 positioned on the guide rail 5, resonating at the frequency of the induction line 15. The alternating current caused by this electromotive force is rectified by the rectifying circuit 57, rectified at a prescribed voltage by the stabilized power supply circuit 58, and caused to pass through the inverter 63 to be supplied to the electric motor with reduction gear 2C. The traveling wheel 2A is driven by the motor 2C to which the current is supplied, and the transportation vehicle 1 moves by being guided by the guide rail 5.

In this way, power can be fed in a non-contact manner to the transportation vehicle 1, so that the conventional problem such as the abrasion of the conducting rail and the generation of dust can be eliminated, thus realizing a maintenance-free operation. Further, the center of the pickup coil 36 is positioned in the center of one pair of induction lines 15 of the induction line unit 11, perpendicular to the guide rail 5. Moreover, the upper and lower protrusions 32A of the ferrite core 32 are adjusted to be positioned above and below the induction line 15 and are fixed in place. Hence the pickup coil 36 is positioned in a site where the highest magnetic flux density is generated by the induction lines 15, and a magnetic circuit occurs in the upper and lower protrusions 32A of the ferrite core 32 with high magnetic permeability. Thus, the largest electromotive force is induced, and power can be fed efficiently.

Further, as indicated in FIG. 1, the thickness T of the cover joining member 71 which connects the induction line cover 21 is formed to be accommodated within the range of the outer diameter D of the cylinder-shaped section 22 when the engaging sections 25 of the above induction line cover 21 are engaged with the bracket 12, so that while enabling strong and stable connection with the induction line cover 21 by the cover joining member 71, a sufficient clearance can be secured between the cover joining member 71 and the pickup coil 36. In addition, no affect is made on the clearance between the induction line cover 21 and the pickup coil 36.

As a result, no interference (physical contact) occurs between cover joining members 71 and pickup coils 36 due to deformation arising from assembly precision, manufacturing precision, or thermal expansion, and breakage of cover joining members 71 does not occur.

Figure 11:
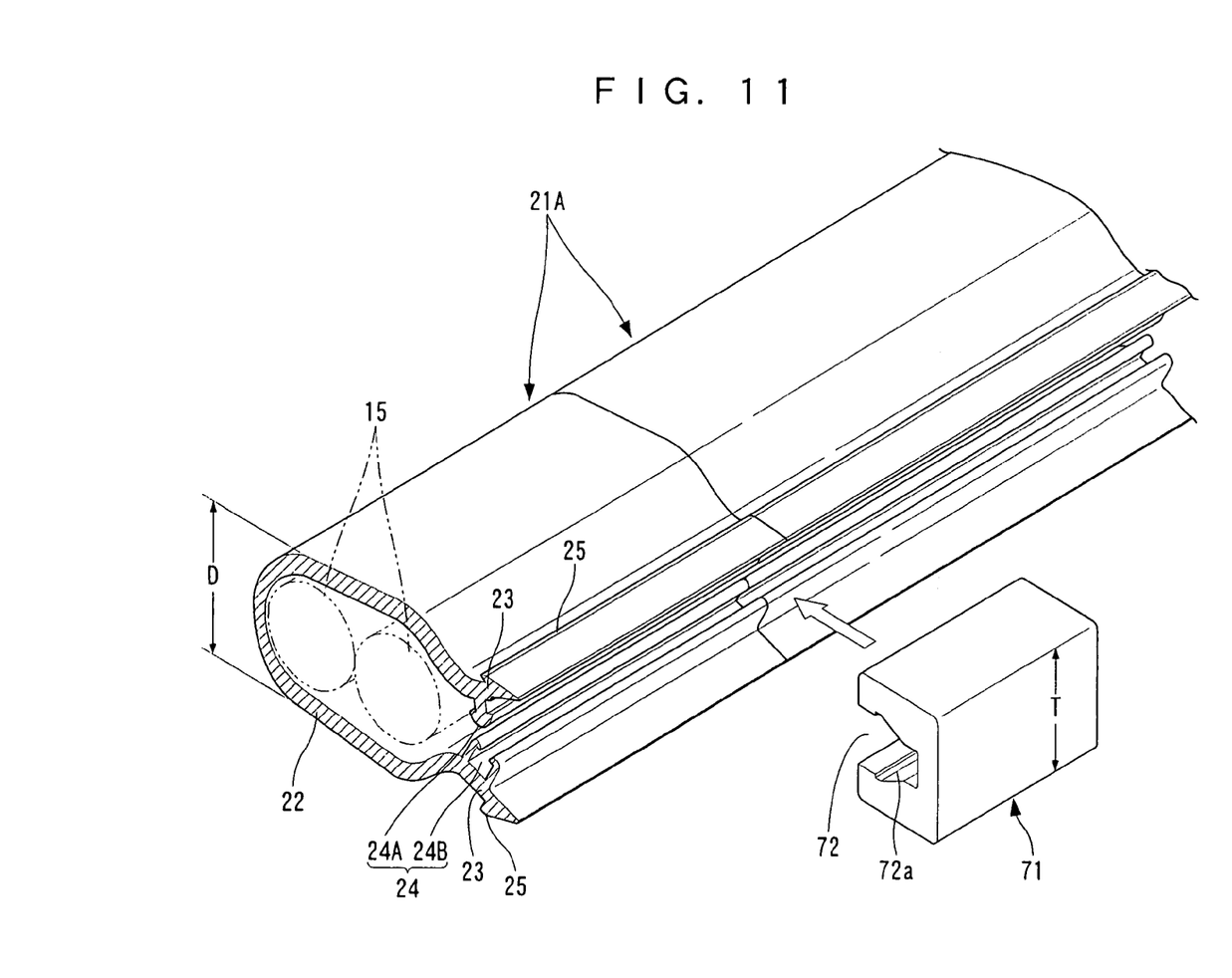
FIG. 11 is a partially cutaway view in perspective of an induction line cover according to a second embodiment of the invention.

Next, a second embodiment of the invention is explained based on FIG. 11.

The cylinder-shaped section 22 of the induction line cover 21A has an inner-face shape capable of fitting a plurality of (two) induction lines 15 in a row.

Figure 12:
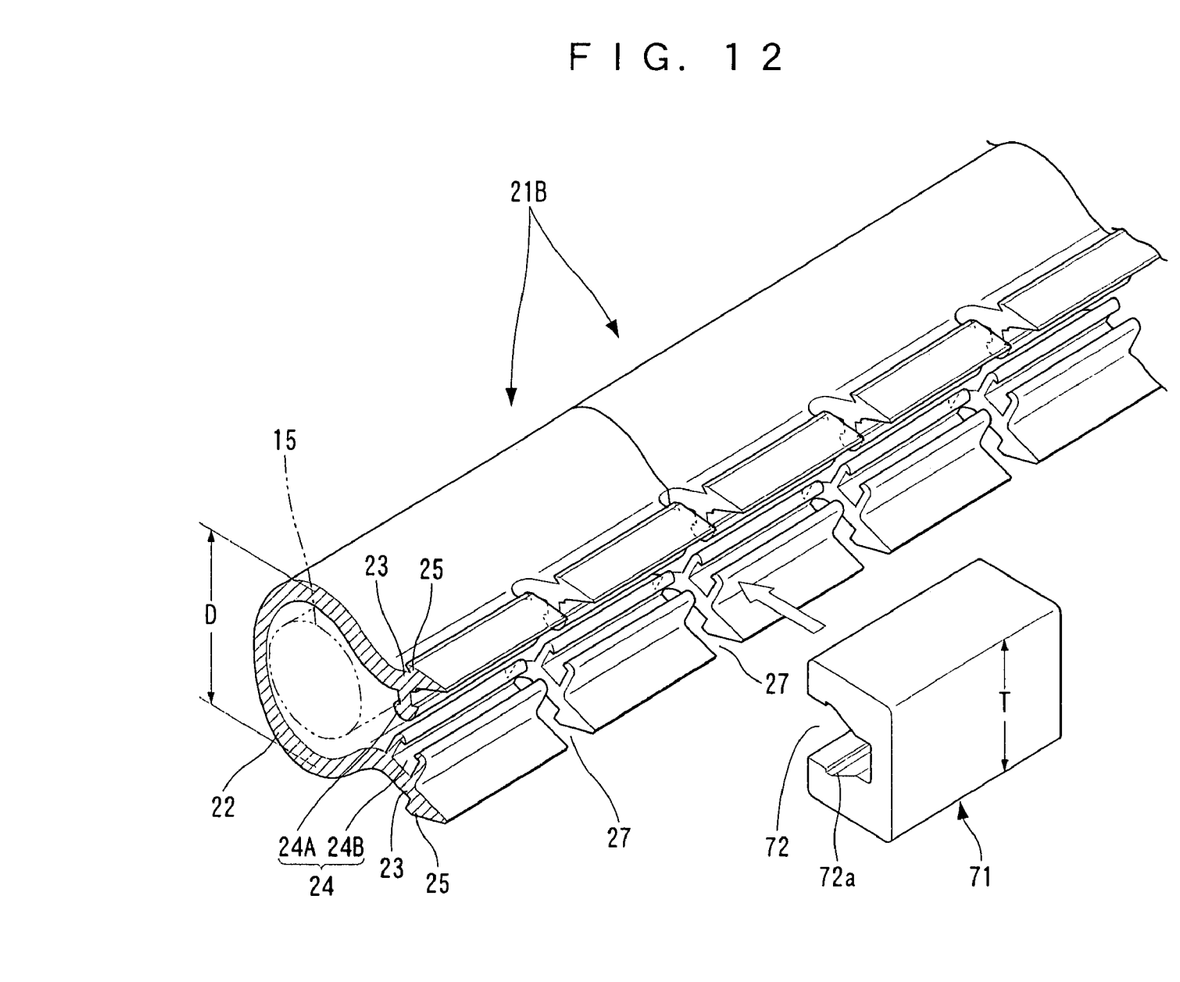
FIG. 12 is a partially cutaway view in perspective of an induction line cover according to a third embodiment of the invention.

Next, a third embodiment of this invention is explained based on FIG. 12.

Because of the interference of the plate-shaped sections 23 having engaging/disengaging locks 24 and engaging sections 25 interfere, the induction line cover 21 cannot be used at curved sections of the guide rail 5. Hence in the curved sections, dedicated induction line covers 21B for use in curves are used. The covers 21B are formed with cut-outs 27 at prescribed intervals in the plate-shaped sections 23 of the induction line cover 21B, including the engaging/disengaging locks 24 and engaging sections 25, so as to be separated into a plurality of sections in the longitudinal direction. With these induction line covers 21B, the induction line 15 can be covered in close contact without difficulty even in curved sections of the guide rail 5.

Figure 13:
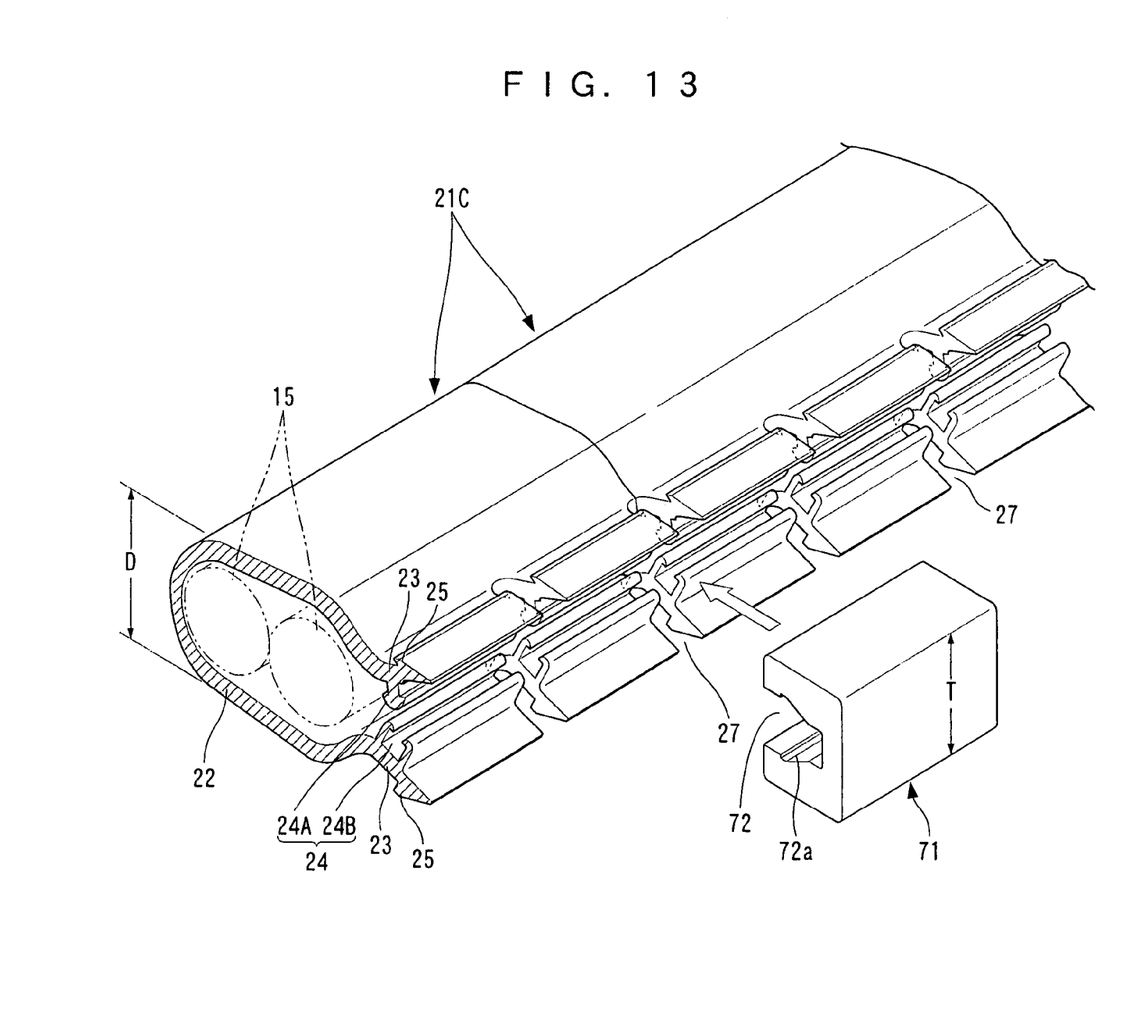
FIG. 13 is a partially cutaway view in perspective of an induction line cover according to a fourth embodiment of the invention.

Next, a fourth embodiment of this invention is explained based on FIG. 13.

The cylinder-shaped section 22 of the induction line cover 21C has an inner face shape capable of fitting a plurality of (two) induction lines 15 in a row. And, cut-outs 27 are provided at a prescribed interval in the plate-shaped sections 23 of the induction line cover 21C, including the engaging/disengaging locks 24 and engaging sections 25. Thus, the induction line cover 21C is cut into a plurality of sections in the longitudinal direction. With these induction line covers 21C, the induction line 15 can be covered in close contact without difficulty even in curved sections of the guide rail 5.

In the above second through fourth embodiments, too, the ends of the above induction line covers 21A to 21C are connected by the cover joining members 71, and the cover joining members 71 are formed to be accommodated within the range of the outer diameter D of the cylinder-shaped section 22 when the engaging sections 25 of the above induction line covers 21 are engaged with the brackets 12.

In each of the above embodiments, a cover joining member 71 formed from resin is described, but the member 71 may be formed from rubber. In the case of such a rubber cover joining member, step-shaped sections are not formed, and the engaging sections 25 bite into the section in which the receiving section is formed to effect engaging.

In each of the above embodiments, an engaging/disengaging lock 24 comprising a protrusion 24A and recess 24B is shown to be formed at the inner opposing faces of the plate-shaped sections 23, however another design may be employed in which there is no engaging/disengaging lock 24.

In each of the above embodiments, a concave groove 26 is formed between the two plate-shaped sections 23 on the outer side of the engaging/disengaging lock 24 when the engaging/disengaging lock 24 is in the locked state, however another configuration may be employed in which this concave groove is not formed.

In each of the above embodiments, one or two induction lines 15 are laid on a guide rail 5, however two or more induction lines 15 may be laid on the guide rail 5 to supply increased power.

In each of the above embodiments, a transportation vehicle 1 moving in a horizontal direction is described, however a transportation vehicle (a moving body) which moves in a vertical direction along a rail path may be adopted likewise and similar advantageous results can be expected.

What is claimed is:

1. An induction-line-cover connection structure for use in a non-contact power supply system for a moving body, said system comprising an induction line arranged to extend along a movement track of the moving body and to have a high-frequency sine-wave current pass therethrough, and said moving body comprising a pickup coil for picking up power from the induction line in a non-contact manner, said induction line cover connection structure comprised of abutting ends of two induction line covers and a cover joining member, wherein
   each of said two induction line covers is comprised of:
   a cylinder-shaped section for fitting therein the induction line;
   plate-shaped sections continuously connected outwardly from a pair of ends created by cutting out from the cylinder-shaped section a portion in a longitudinal direction at a circumferential position of the cylinder-shaped section; and
   engaging sections formed adjacent outer faces of the plate-shaped sections and being engageable toward said movement track, and wherein
   said cover joining member overlying said ends of said induction line covers is a block that is comprised of a receiving section receiving said engaging sections of said induction line covers and is formed such that the entire joining member falls within two parallel planes separated by a distance equal to an outer diameter of the cylinder-shaped section of said induction line covers when said engaging sections are engaged toward the movement track.

2. The induction line cover connection structure according to claim 1, wherein an engaging/disengaging lock is formed between said plate-shaped sections, said engaging/disengaging lock comprising a protrusion and a recess respectively formed on mutually opposing inner faces of said plate-shaped sections, said protrusion and recess being integrally formed as part of said plate-shaped sections.

3. The induction line cover connection structure according to claim 2, wherein a concave groove is formed outside the engaging/disengaging lock between said plate-shaped sections when the engaging/disengaging lock is in a locked state.

* * * * *